United States Patent
Park et al.

(10) Patent No.: US 8,208,486 B2
(45) Date of Patent: Jun. 26, 2012

(54) APPARATUS AND CONTROL METHOD FOR ENERGY-AWARE HOME GATEWAY BASED ON NETWORK

(75) Inventors: Wan Ki Park, Daejeon (KR); Chang-Sic Choi, Daejeon (KR); Intark Han, Daejeon (KR); Youngwoo Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 199 days.

(21) Appl. No.: 12/331,182

(22) Filed: Dec. 9, 2008

(65) Prior Publication Data

US 2009/0147696 A1    Jun. 11, 2009

(30) Foreign Application Priority Data

Dec. 10, 2007   (KR) ................... 10-2007-0127615

(51) Int. Cl.
  *H04L 12/66* (2006.01)
  *H04L 12/56* (2006.01)
  *H04L 12/28* (2006.01)
  *H04Q 11/00* (2006.01)
  *G06F 1/32* (2006.01)

(52) U.S. Cl. ........ 370/463; 370/359; 370/419; 370/401; 713/320

(58) Field of Classification Search ................ 370/252, 370/311, 401–402; 714/320
  See application file for complete search history.

(56) References Cited

U.S. PATENT DOCUMENTS

| | | | |
|---|---|---|---|
| 6,901,298 B1 * | 5/2005 | Govindaraj et al. | 700/21 |
| 7,065,663 B2 * | 6/2006 | Sheller | 713/320 |
| 7,260,729 B2 | 8/2007 | Araki | |
| 7,421,599 B2 * | 9/2008 | Bahali et al. | 713/320 |
| 7,594,073 B2 * | 9/2009 | Hanebutte et al. | 711/113 |
| 2002/0004912 A1 * | 1/2002 | Fung | 713/300 |
| 2004/0003223 A1 * | 1/2004 | Fortin et al. | 713/1 |
| 2004/0053643 A1 * | 3/2004 | Kimura | 455/558 |
| 2004/0254683 A1 | 12/2004 | Kim | |
| 2005/0060588 A1 * | 3/2005 | Araki | 713/300 |

(Continued)

FOREIGN PATENT DOCUMENTS

| | | |
|---|---|---|
| JP | 2005-062955 | 3/2005 |
| KR | 10-2004-0019602 | 3/2004 |
| KR | 10-2004-0079474 | 9/2004 |
| KR | 10-2006-0095230 | 8/2006 |
| KR | 10-2007-0108060 | 11/2007 |

OTHER PUBLICATIONS

Notice of Allowance issued Jul. 30, 2009 in corresponding Korean Application No. 10-2007-0127615.

*Primary Examiner* — Warner Wong
(74) *Attorney, Agent, or Firm* — Staas & Halsey LLP (57) ABSTRACT

An energy-aware home gateway based on a network protocol includes a network matching module for performing a physical network interface function on a home and an external network; a processor module for performing an operation and a control function of a system in a active state in which service traffic exists; a memory module used as a system memory of the processor module; and a service function module controlled by the processor module and performing a service function depending on a use state. The home gateway further includes a network protocol agent module for processing control traffic in an idle state in which no service traffic exists; and a power supply module for supplying power to the overall system in the normal active state and for supplying power to the network matching module, the memory module, and the network protocol agent module in the idle state.

13 Claims, 8 Drawing Sheets

U.S. PATENT DOCUMENTS

| | | | |
|---|---|---|---|
| 2006/0053325 A1* | 3/2006 | Chary et al. | 713/320 |
| 2006/0143487 A1* | 6/2006 | Kardach et al. | 713/320 |
| 2007/0260867 A1 | 11/2007 | Ethier et al. | |
| 2009/0177899 A1* | 7/2009 | Chen et al. | 713/300 |

* cited by examiner

APPARATUS AND CONTROL METHOD FOR ENERGY-AWARE HOME GATEWAY BASED ON NETWORK

CROSS-REFERENCE(S) TO RELATED APPLICATIONS

The present invention claims priority of Korean Patent Application No. 10-2007-0127615, filed on Dec. 10, 2007, which is incorporated herein by reference.

FIELD OF THE INVENTION

The present invention relates to an energy-aware home gateway based on a network protocol and a control method thereof; and, more particularly, to an energy-aware home gateway based on a network protocol and a control method thereof capable of reducing power consumption of the home gateway which must always be operated in order to connect a home network appliance on the premises with an access network off the premises.

This work was supported by the IT R&D program of MIC/IITA. [2007-S-009-01, Development of Platform Technology to Reduce the Power Consumption in Always-On Home Network Systems]

BACKGROUND OF THE INVENTION

With the development of network technologies and with the distribution of home network systems, a variety of home network devices are used at home. Further, as the proliferation of the Internet increases, many homes use various types of services that access the Internet. The use of various types of services makes it impossible to easily predict when and how the home network devices are connected with equipments of service providers on the Internet, and when and how each service provider provides service. Therefore, in order to cope with this situation, a home gateway serving to connect the home network devices to the external network must be turned on 24 hours a day.

Due to this situation, although little power is used for the home gateway, the home network device, such as the home gateway, accounts for an increasing proportion of the power consumption of each home as the distributed number thereof is increased. Thus, the power consumption thereof is in no way negligible, nationally or internationally. Further, the national or international importance of saving energy is rising in view of high oil prices and environmental pollution. As such, technology for an energy-aware home gateway capable of providing an automatic power saving function is required.

Energy-aware technology that is applied to the fields of conventional home network devices and telecommunication technologies is mainly focused on telecommunications appliances such as monitors, personal computers, mobile phones, and the like. The conventional technologies are integrated into, particularly, an advanced configuration and power interface (ACPI) industry standard for the field of the personal computers. As the most representative example thereof, when there is no input from a user, i.e. an event initiated by the user such as keyboard input or mouse input, power for a corresponding appliance is designed to be interrupted.

Since these energy-aware technologies are restricted to use of each of independent devices, they defy being applied to home network devices, including the home gateway, to which various network appliances are connected.

SUMMARY OF THE INVENTION

It is, therefore, an object of the present invention to provide a solution for such a problem, that is, an energy-aware function which interrupts power for the main processor and service functions of a home gateway operated at all times in the situation where no service is provided, and conducts a service function requested by a user by immediately operating the main processor when a service use event or network traffic attributed to the user is detected, without degrading quality of service for the home network user.

In accordance with one aspect of the invention, there is provided an energy-aware home gateway based on a network protocol, including a network matching module for performing a physical network interface function on a home network and an external network; a processor module for performing an operation function and a control function of an overall system in a normal active state in which service traffic exists; a memory module used as a system memory of the processor module; a service function module controlled by the processor module and performing a service function depending on a use state of a user; a network protocol agent module for processing control traffic in an idle state in which no service traffic exists; and a power supply module for supplying power to the overall system in the normal active state and for supplying power to the network matching module, the memory module, and the network protocol agent module in the idle state.

The processor module may include a main memory having a normal boot region and a wake-up boot region, each of which stores a boot loader, and performs the booting using the boot loader stored in the normal boot region in an event of normal booting, and using the boot loader stored in the wake-up boot region when returning from the idle state to the normal active state.

It is preferable that the network protocol agent module performs control on booting address selection for selecting one of the normal boot region and the wake-up boot region in an event of the booting.

The memory module may store a processor context of the processor function module in the idle state, and provide the processor context when returning from the idle state to the normal active state.

Further, the network protocol agent module may perform a self-refresh control function on the memory module such that the processor context is continuously maintained during the idle state without being erased.

It is preferable that the network protocol agent module includes a network protocol agent core processor for providing network connectivity between a home network appliance in the home network and the external network in the idle state and for detecting an operation of the system; and an agent information storage for storing information required to operate the network protocol agent core processor.

The network protocol agent module may include a service detector for detecting a user event in the idle state, and informing the processor function module of the detected result.

Further, the network protocol agent module may include a power controller for operating the power supply module.

The home gateway individually preferably performs power control on each of service function sub-modules included in the service function module in the normal active state based on an operation state of a corresponding service so that power to a part of the service function is supplied or interrupted.

Preferably, the network protocol agent module may perform a relay function for a peripheral component interconnect (PCI) bus and a local bus when the PCI bus or the local bus is affected by interrupting the power depending on a device interacting with the processor module.

In accordance with another aspect of the invention, there is provided a method of controlling an energy-aware home gateway based on a network protocol, the method including detecting an idle condition that no service traffic exists, in a normal active state in which the service traffic exists; storing a processor context of a main processor in order to store a current operation state when the idle condition is detected; interrupting power to the main processor after the processor context is stored; and monitoring user data traffic and user service event by processing control traffic and monitoring network traffic in an idle state after the power is interrupted.

The method may further include performing a self-refresh control operation in the idle state in order to maintain contents of the processor context.

The method may further include detecting a wake-up condition by monitoring the user data traffic or and the user service event in the idle state; performing booting using a boot loader stored in a wake-up boot region of a main memory when the wake-up condition is detected; and returning to the normal active state through recovery of the pre-stored processor context.

It is preferable that the returning includes determining by which event the wake-up event occurs through examining contents of wake-up event registers and performing subsequent processes associated with the event.

In accordance with the present invention, when there is no user traffic, a home gateway is operated in an idle state so as to minimize power consumption, and also, in the idle state, the home gateway relays control traffic between an external network and a home network appliance in order to maintain a network session between the external network and the home network appliance in a minimum power consumption state of the system and monitors an event in order to allow the system to return to an active state within the shortest possible time when user service traffic occurs or a service function is used.

Thus, the home gateway provides convenience and a maximum power saving effect to the user by autonomously controlling a power saving mode and a normal operation mode without the user intervening in the operation of the system.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings so that they can be readily implemented by those skilled in the art. The detailed descriptions of known functions and constructions that unnecessarily obscure the subject matter of the present invention will be avoided herein.

The present invention is applied to a home network appliance having a networking function, i.e. a home gateway, whereby the present invention performs a power saving function by detecting that there is no user service traffic in the home gateway for itself, and thereby stopping functions of a main processor and a service in order to address the problem of excessive power consumption caused by all-time operation; and, in an idle state for functioning power saving, the home gateway monitors the user service traffic in order to allow itself to convert its state into an active state when the user service traffic and a service event occurs.

Figure 1:
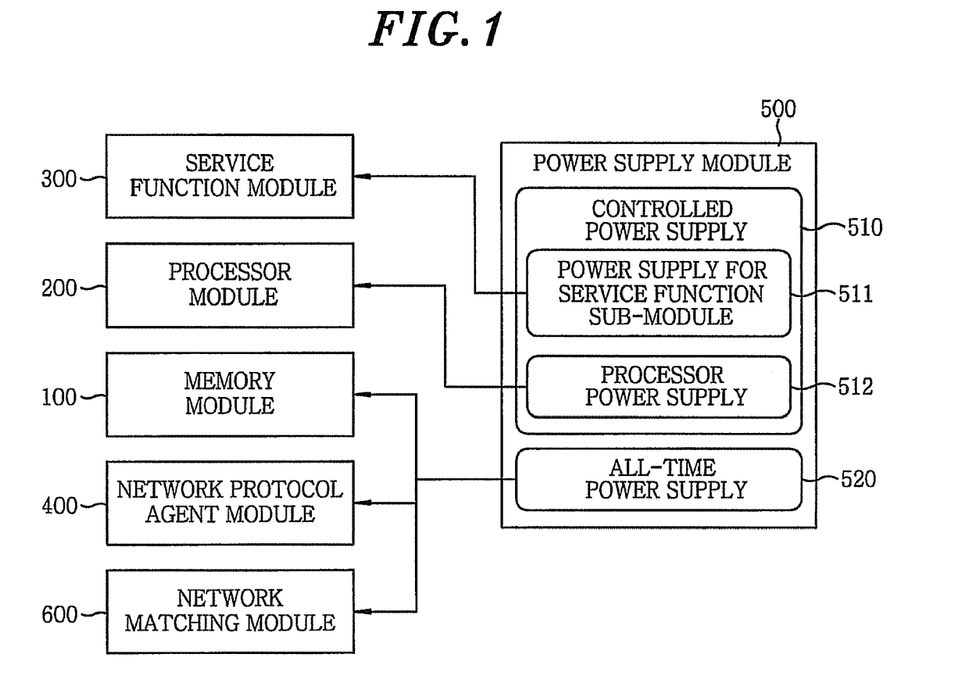
FIG. 1 is a schematic block diagram illustrating an energy-aware home gateway based on a network protocol in accordance with the present invention when viewed from the standpoint of power supply.
Figure 2:
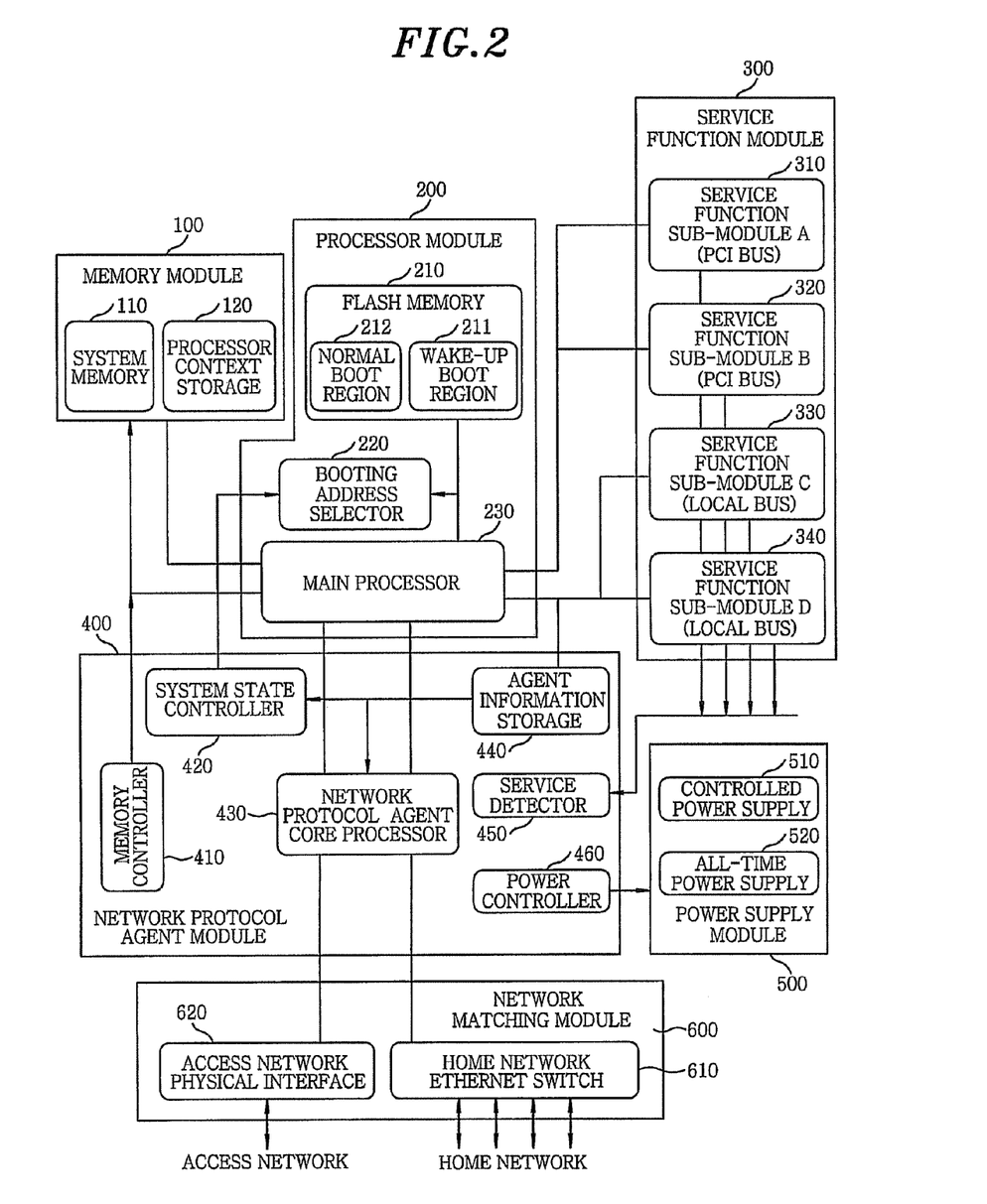
FIG. 2 is a detailed block diagram illustrating an energy-aware home gateway based on a network protocol in accordance with the present invention.
Figure 3:
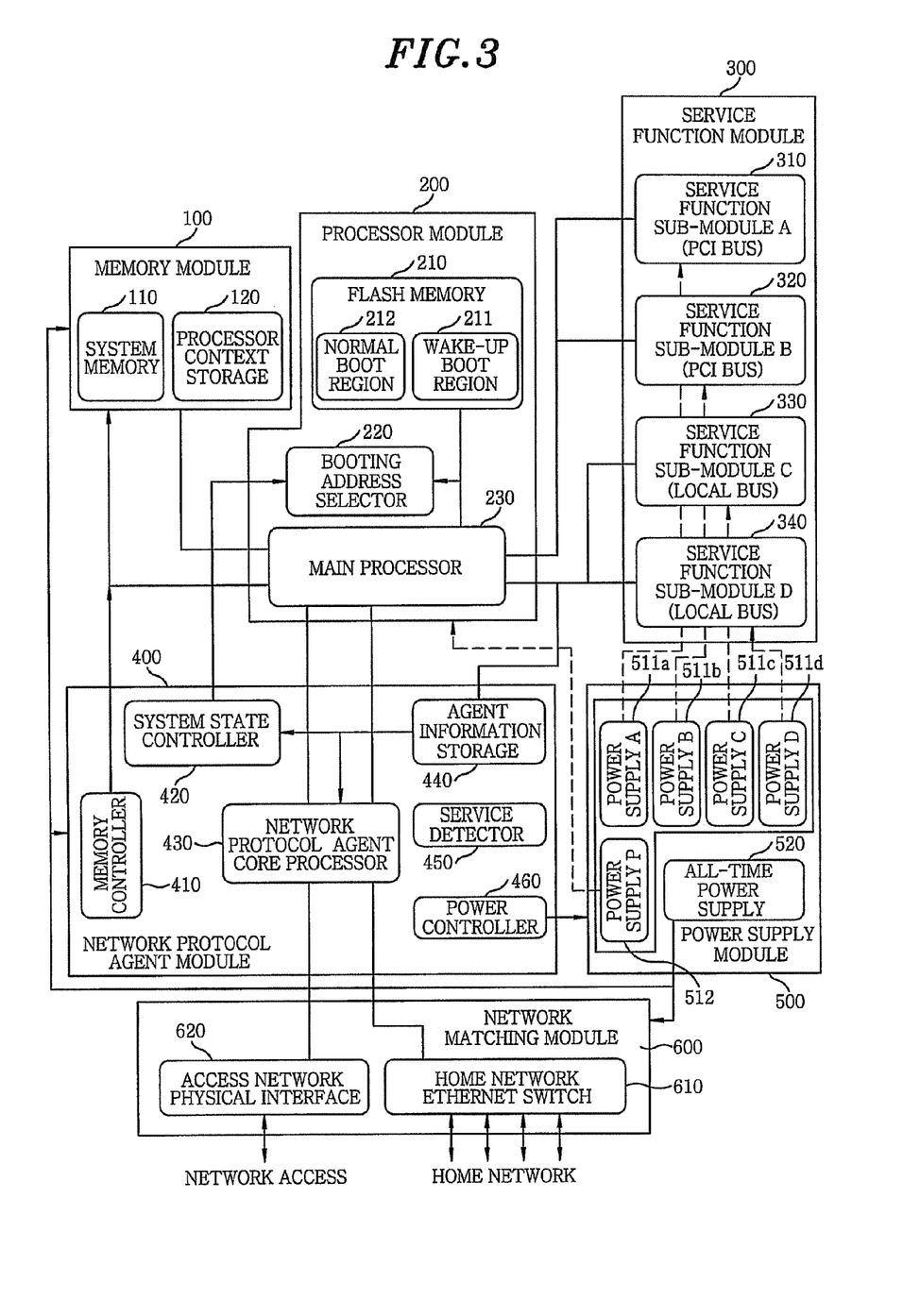
FIG. 3 is a block diagram illustrating a power supply path of an energy-aware home gateway based on a network protocol in accordance with the present invention.

FIG. 1 is a schematic block diagram illustrating an energy-aware home gateway based on a network protocol in accordance with the present invention when viewed from the standpoint of power supply. FIG. 2 is a detailed block diagram illustrating an energy-aware home gateway based on a network protocol in accordance with the present invention. FIG. 3 is a block diagram illustrating the power supply path of an energy-aware home gateway based on a network protocol in accordance with the present invention.

Referring to FIGS. 1 to 3, the home gateway in accordance with the present invention includes a network matching module 600 performing as a physical network interface to a home network and an external network, a processor module 200 performing an operation and a control function of an overall system in an active state in which service traffic exists, a memory module 100 used as a system memory of the processor module 200, a service function module 300 controlled by the processor module 200 thereby performing a service function operation depending on a state used by a user, a network protocol agent module 400 processing control traffic in an idle state in which no service traffic exists, and a power supply module 500 for supplying power to the overall system in the active state and supplying power to the network matching module 600, the memory module 100 and network protocol agent module 400 in the idle state.

The memory module 100 includes a system memory 110 and a processor context storage 120, and the processor module 200 includes a flash memory 210 as a main memory, a booting address selector 220, and a main processor 230, wherein the flash memory 210 has a normal boot region 212 and a wake-up boot region 211.

The network protocol agent module 400 includes a memory controller 410, a system state controller 420, a network protocol agent core processor 430, an agent information storage 440, a service detector 450 and a power controller 460.

The power supply module 500 includes a controlled power supply 510 and an all-time power supply 520, wherein the controlled power supply 510 includes power supplies 511a, 511b, 511c and 511d for respective service function sub-modules, and a processor power supply 512.

The network matching module 600 includes a home network Ethernet switch 610 and an access network physical interface 620.

The network matching module 600 performs a physical network interface function to the home network and the access network. The access network physical interface 620 performs a matching function on the access network, and the home network Ethernet switch 610 allows the connection of multiple home network Ethernet ports.

In the network protocol agent module 400, the network protocol agent core processor 430 performs only a simple bypass function of a data packet in the active state of the system, thereby minimizing its functions so that additional power consumption caused by adding the network protocol agent module 400 can be minimized. Further, in the state in which the function of the service function module 300 is stopped by the main processor 230, the service detector 450 detects a user event of the service function module 300 according to a service function, and then informs the main processor 230 of the detected result, whereby the main processor 230 controls the power controller 430 of the network protocol agent module 400 so that the necessary service module 300 is selected and operated through the controlled power supply 510 of the power supply module 500. Further, the agent information storage 440 stores information required for operation of the network protocol agent module 400 so that the network protocol agent core processor 430, on behalf of the processor module 200, can process control traffic, i.e. can provide both network connectivity between the home network appliance in the home network and the access network, and a system operation detecting function in the idle state of the processor function module 200. The system state controller 420 of the network protocol agent module 400 makes it possible to store information about the state of the overall system according to the states of the main processor 230 and the network protocol agent module 400. The memory controller 410 of the network protocol agent module 400 does not perform a special control in the active state of the system, but, when the system enters the idle state, the memory controller 410 performs a self-refresh control function on the memory module 100 so that data of the memory module 100, which sores data of the operation and state of the system in the active state, are continuously maintained without being erased.

The memory module 100 includes the system memory 110 and the processor context storage 120. The system memory 110 is used as a system memory of the main processor 230 in the active state. When the main processor 230 enters the idle state, the processor context storage 120 stores contents of internal registers of the main processor 230, so that, at the time when the main processor 230 recovers from the idle state to the active state, the recovering speed is maximized and the active state is continuously maintained.

In the processor module 200, the main processor 230 performs the operation and the control of the overall system in the active state, and the flash memory 210 is divided into the normal boot region 212 and the wake-up boot region 211 so that, when the system is normally booted, a boot loader stored in the normal boot region 212 is used by a control of the booting address selector 220 which operates depending on a boot condition. However, under a wake-up booting condition, in which the system returns from the idle state to the active state, the booting is performed only by the minimum boot loader stored in the wake-up boot region 211. Thereby, the recovery time of the system is minimized. At this time, the control of selecting booting address is carried out through the system state controller 420 of the network protocol agent module 400.

In order to achieve power saving function, the power supply module 500 includes the all-time power supply 520, which is operated by the power controller 460 of the network protocol agent module 400 and always supplies power to the system; and the controlled power supply 510, which selectively supplies power to the individual sub-modules 310, 320, 330 and 340 of the service function module 300 and the processor module 200 based on the state and the control of the system in accordance with the operation of the main processor 230 and the network protocol agent module 400.

The service function module 300 is autonomously controlled by the main processor 230 and decides that each of the service function sub-modules 310, 320, 330 and 340 performs and stops its own function operation in accordance with the use state of the user.

As state above, the energy-aware home gateway in accordance with the present invention divides the power supply module 500 into the all-time power supply 520 and the controlled power supply 510. The all-time power supply 520 continuously supplies necessary power to the memory module 100, network protocol agent module 400, and network matching module 600, all of which need to be always supplied with power, regardless of the operation state (the idle or the active state) of the system. The controlled power supply 510 is divided into the power supplies 511a, 511b, 511c and 511d for the respective service function sub-modules and the processor power supply 512. The processor power supply 512 supplies necessary power to the processor module 200 having the flash memory 210, the booting address selector 220 and the main processor 230.

Figure 4:
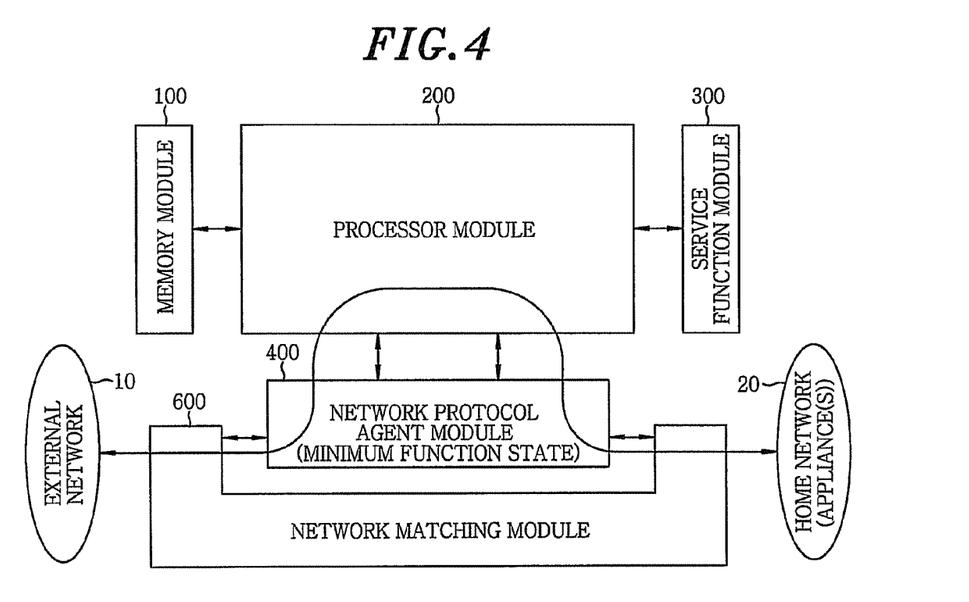
FIG. 4 illustrates a communication path when an energy-aware home gateway in accordance with the present invention is in an active state.
Figure 5:
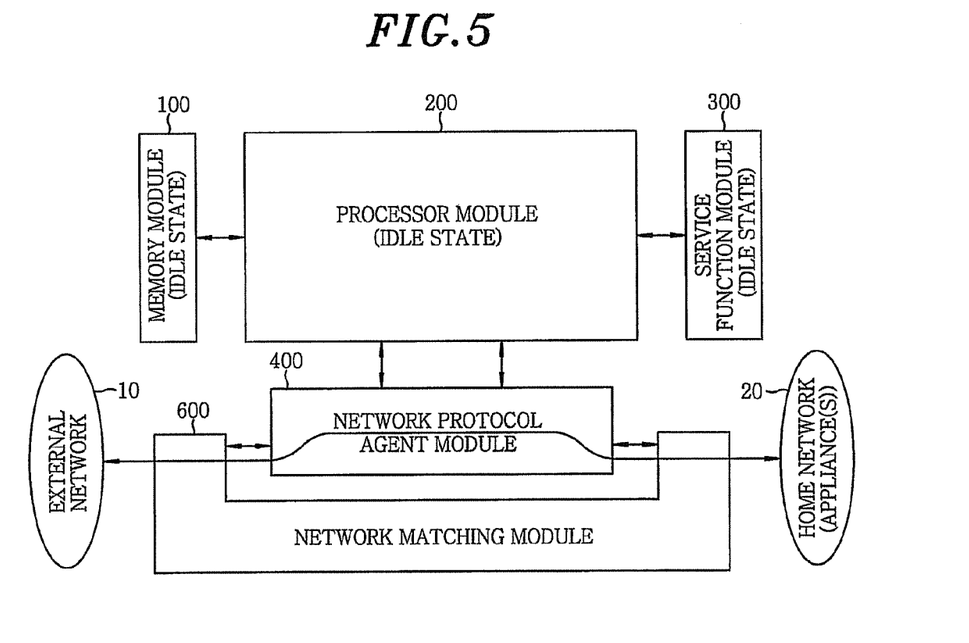
FIG. 5 illustrates a communication path when an energy-aware home gateway in accordance with the present invention is in an idle state.

FIG. 4 illustrates a communication path when an energy-aware home gateway in accordance with the present invention is in an active state, and FIG. 5 illustrates a communication path when an energy-aware home gateway in accordance with the present invention is in an idle state.

As for a traffic stream in the active state of the system, as shown in FIG. 4, network traffic to be transmitted from an external network 10 to one or more home network appliances 20 passes through the network matching module 600, the network protocol agent module 400, and then the processor module 200. The network traffic is converted into a private IP address of the home network appliance in the home network in accordance with a destination thereof, and is then transmitted to the home network appliance in the home network as the final destination via the network protocol agent module 400 and the network matching module 600. The network traffic to be transmitted in reverse from the home network appliance to the external network is sequentially transmitted to the network matching module 600, network protocol agent module 400, processor module 200, the network protocol agent module 400, network matching module 600 and the external network 10.

On the other hand, in the idle state of the system, as described in FIG. 5, the network traffic between the external network 10 and the home network appliance 20 is processed by the network protocol agent module 400 without passing through the processor module 200 in the idle state, so that the communication is carried out between the external network 10 and the home network appliance 20. In this idle state, the network protocol agent module 400 transmits control traffic for maintaining the communication and the network session connection between the external network 10 and the home network appliance 20, taking the place of the processor module 200.

Figure 6:
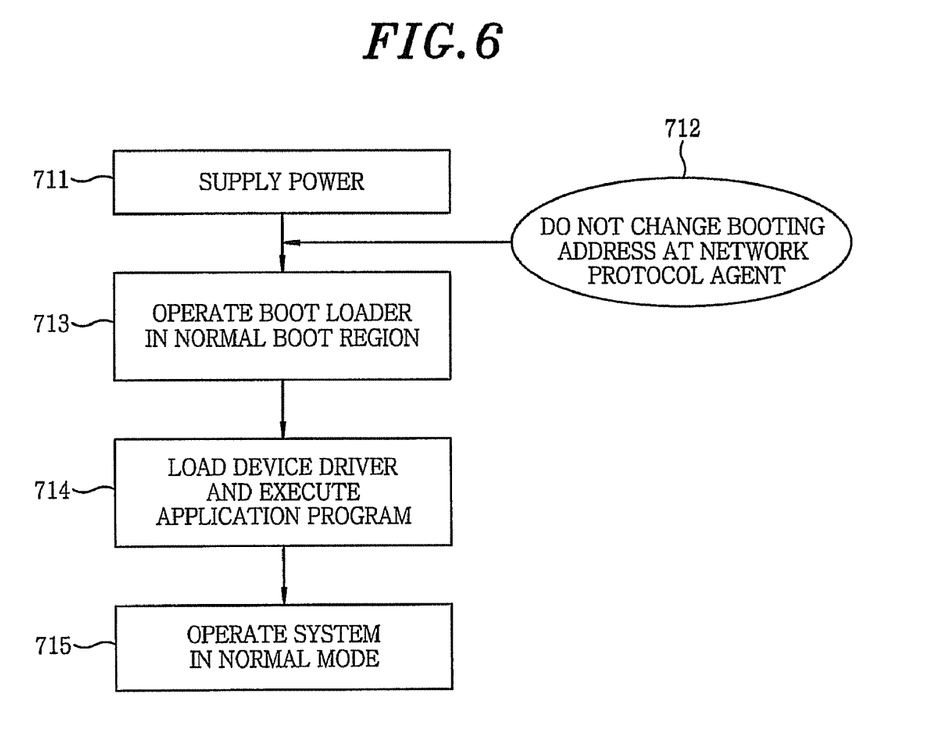
FIG. 6 is a flow chart explaining a process of a normal operation in a method of controlling an energy-aware home gateway based on a network protocol in accordance with the present invention.

FIG. 6 is a flow chart explaining a process of a normal active operation in a method of controlling an energy-aware home gateway based on a network protocol in accordance with the present invention.

As illustrated in FIG. 6, in the active state, the network protocol agent module 400 does not perform a special control, so that the system can be booted from the normal boot region 212 of the flash memory 210, and thus the general booting operation is done as explained in the process of FIG. 6. The power supply module 500 supplies power to the processor module 200 (S711). The system state controller 420 of the network protocol agent module 400 does not perform control of changing a booting address (S712). Then, the main processor 230 performs booting process by using a boot loader of the normal boot region 212 under the control of the booting address selector 220 (S713). Like a typical booting process, a device driver is loaded, and an application program is executed (S714). Thereby, the system is operated in a normal mode (S715).

Figure 7:
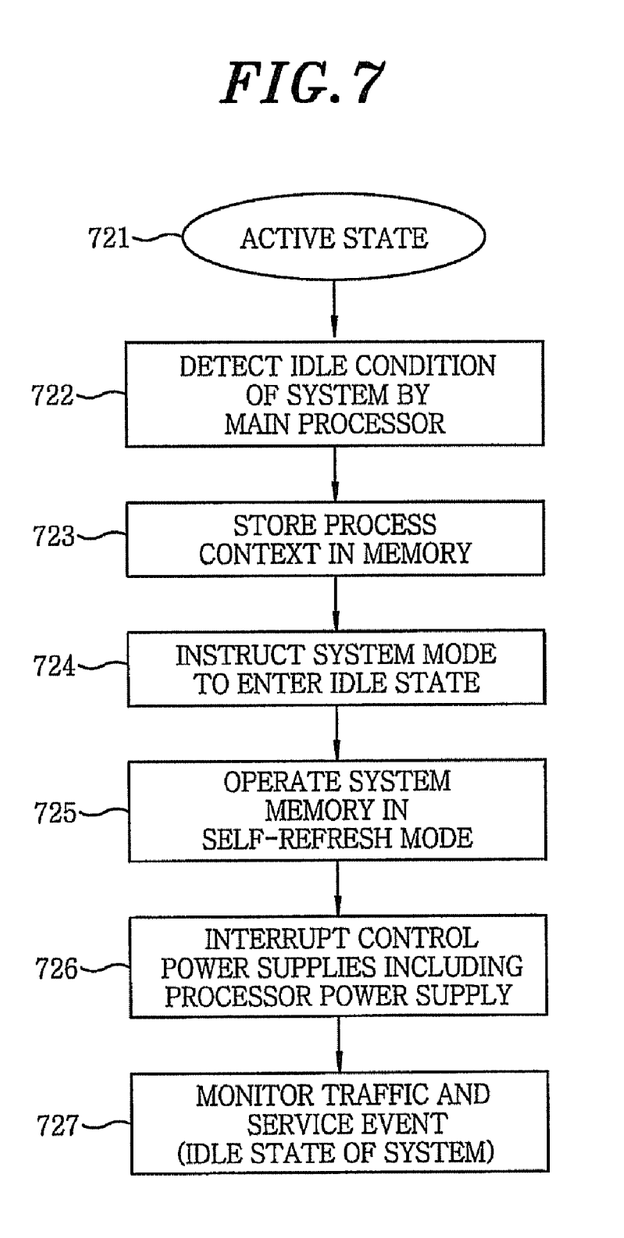
FIG. 7 is a flow chart explaining a process of converting from an active state into an idle state in a method of controlling an energy-aware home gateway based on a network protocol in accordance with the present invention.

FIG. 7 is a flow chart explaining a process of converting from an active state to an idle state in a method of controlling an energy-aware home gateway based on a network protocol in accordance with the present invention.

When the main processor 230, which is in an active state (S721), detects an idle condition of the system (S722), the main processor 230 stores its own processor context in the processor context storage 120 of the memory module 100 in order to store its own current operation state (S723). Afterwards, the system processor (the main processor 230) instructs the network protocol agent module 400 to make the system enter an idle state. Thereby, the memory controller 410 of the network protocol agent module 400 performs a self-refresh control operation on the memory module 100 in order to maintain the current operation state to thereby keep the content of the system memory during the idle state (S725). Then, the power supplied to the system processor is interrupted under the control of the controlled power supply 510 of the power supply module 500 (S726), so that the power saving function is performed. During the idle state of the system, the network protocol agent module 400 processes control traffic transmitted through the home gateway in order to maintain a session, monitors user data traffic by monitoring network traffic, and monitors a user service event (S727).

Figure 8:
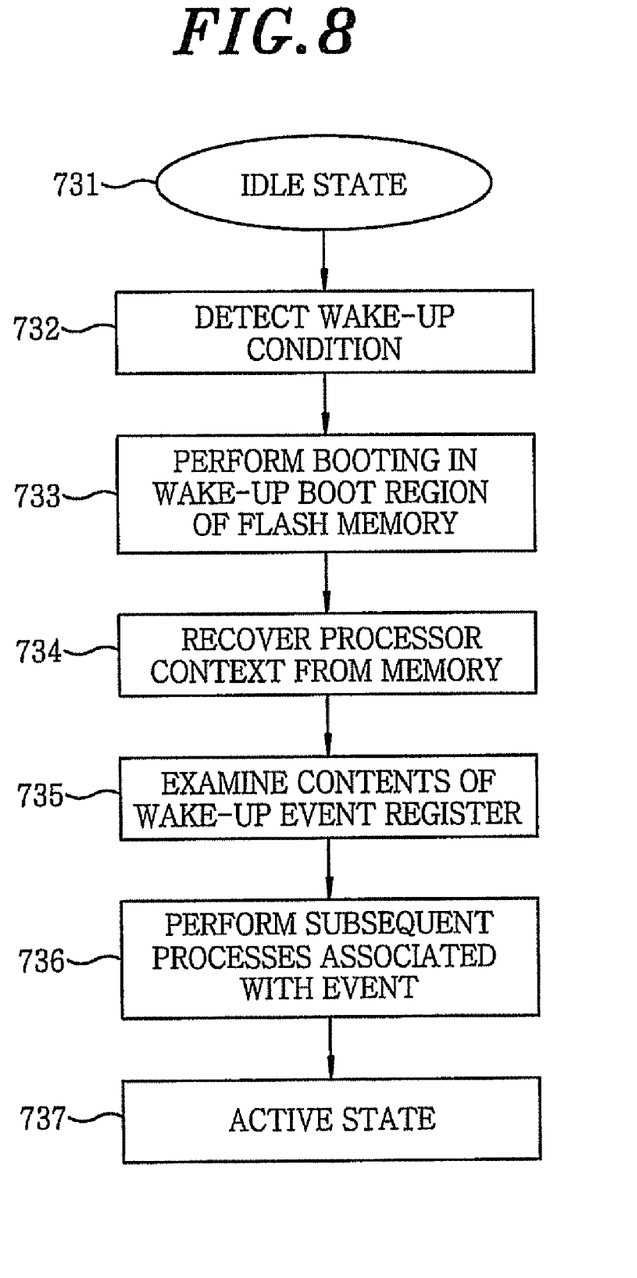
FIG. 8 is a flow chart explaining a process of converting from an idle state into an active state in a method of controlling an energy-aware home gateway based on a network protocol in accordance with the present invention.

FIG. 8 is a flow chart explaining a process of converting from an idle state into an active state in a method of controlling an energy-aware home gateway based on a network protocol in accordance with the present invention.

In the idle state of the system (S731), the network protocol agent module 400 can detect a wake-up condition by detecting user data traffic or a user service event (S732). When the wake-up condition is detected (S732), the system is booted using the wake-up boot region 211 of the flash memory 210 under the control of the booting address selector 220 based on the state control of the network protocol agent module 400 (S733). Then, the processor context of the active state which has been stored in the processor context storage 120 of the memory module 100 is recovered (S734) so that the system returns to the active state within a minimum time. The network protocol agent module 400 examines which event woke up the system (S735), so that subsequent processes associated with the event, such as device driver loading, network address conversion or the like, are performed (S736). Thereby, the system returns to the active state (S737).

Figure 9:
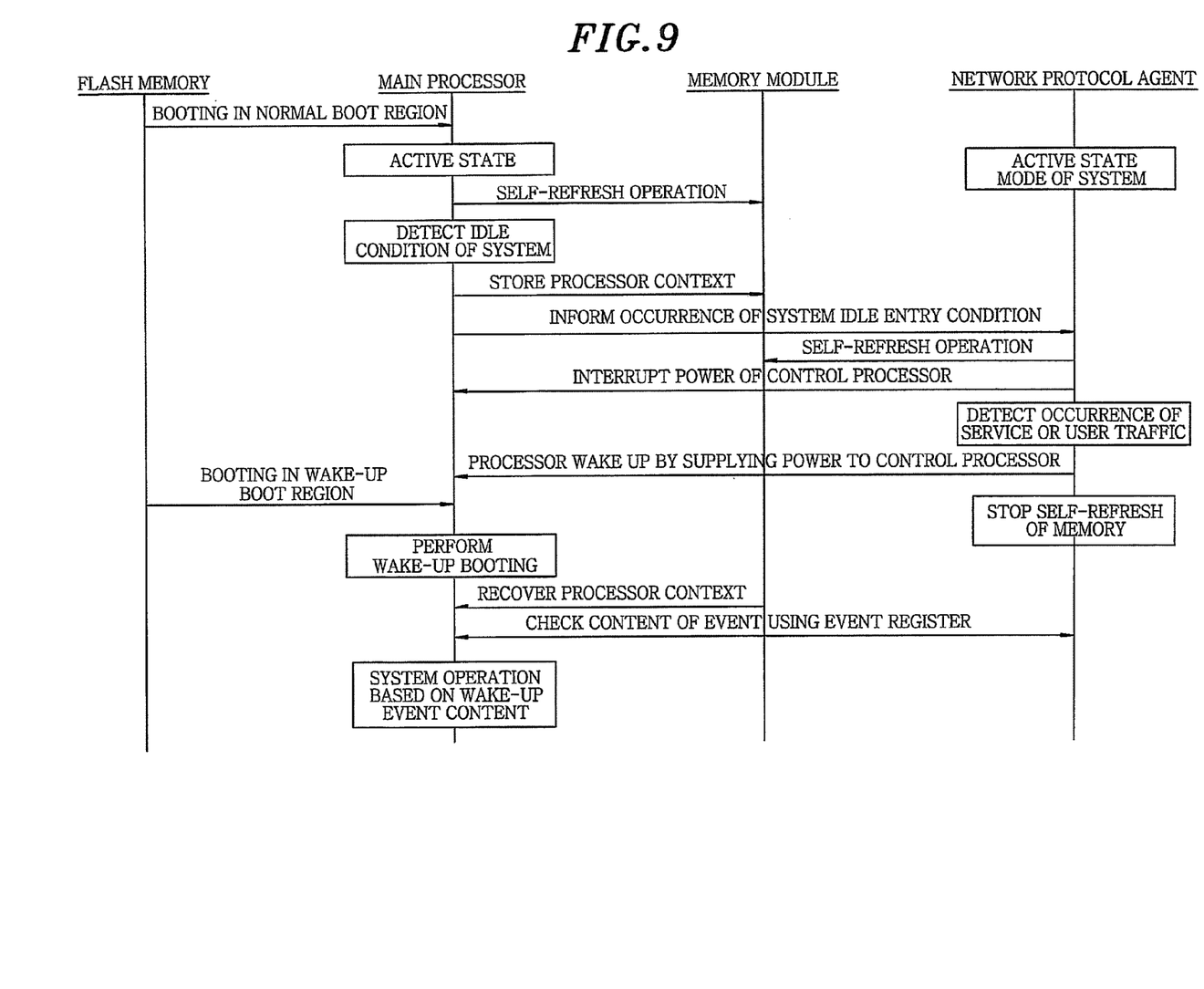
FIG. 9 is a flow chart illustrating a sequential operation process of the energy-aware home gateway based on a network protocol in accordance with the present invention, which has been described with reference to FIGS. 6 and 7.

FIG. 9 is a flow chart illustrating the sequential operation processes of the energy-aware home gateway based on a network protocol in accordance with the present invention, which has been described with reference to FIGS. 6 and 7.

Although only the exemplary embodiment of the present invention has been described above, it will be apparent to the skilled in the art that various modifications, additions and substitutions are possible.

For example, while each of the service function sub-modules 310, 320, 330 and 340 of the service function module 300 are controlled by each power supplies 511a, 511b, 511c and 511d of the controlled power supply in the active state of the system in which the main processor 230, as the system processor, is operated normally, each of the service function sub-modules 310, 320, 330 and 340 may be individually controlled with power supply based on a operation state of each service thereof, whereby some of the service function sub-modules are partially supplied with or interrupted from power. As a result, the power saving function can be improved. However, as the power saving function is performed on the respective service function sub-modules, in a case where the power of the devices interacting with the system processor through a peripheral component interconnect (PCI) bus and a local bus is interrupted, a problem can be happened that the PCI bus and the local bus is fixed as a "1" or a "0" state, depending on the devices. In the case in which such a device is used, the home gateway can be implemented to operate the system by performing a relay function for the PCI bus and the local bus in the network protocol agent module 400. In other words, implemented is the relay function for the local or the PCI bus in the case where the local bus or the PCI bus is affected depending on the device interacting the processor module 200.

These modifications do not depart from the scope of the invention as disclosed in the accompanying claims.

The present invention can be applied to not only home gateway but also development of power saving function of all-time operated equipment such as a computer network interface appliance and a home network server having a network interface, or the like, and even more broadly to IT appliances in which most work is done in a network environment.

While the invention has been shown and described with respect to the embodiments, it will be understood by those skilled in the art that various changes and modifications may be made without departing from the scope of the invention as defined in the following claims.

What is claimed is:

1. An energy-aware home gateway based on a network protocol, comprising:
   a network matching module for performing a physical network interface function on a home network and an external network;
   a processor module for performing an operation function and a control function of an overall system in a normal active state in which service traffic exists;
   a memory module used as a system memory of the processor module;
   a service function module controlled by the processor module and performing a service function depending on a use state of a user, the service function module including service function sub-modules;
   a network protocol agent module for processing control traffic in an idle state in which no service traffic exists; and a power supply module for supplying power to the overall system in the normal active state and for supplying power to the network matching module, the memory module, and the network protocol agent module in the idle state, wherein the processor module individually performs a power control on each of the service function sub-modules in the normal active state based on an operation state of the service function module, the operation state is determined based on the use state of the user, so that power to a part of the service function sub-modules is supplied or interrupted.

2. The energy-aware home gateway of claim 1, wherein the processor module includes a main memory having a normal boot region and a wake-up boot region, each of which stores a boot loader, and performs the booting using the boot loader stored in the normal boot region in an event of normal booting, and using the boot loader stored in the wake-up boot region when returning from the idle state to the normal active state.

3. The energy-aware home gateway of claim 2, wherein the network protocol agent module performs a control on booting address selection for selecting one of the normal boot region and the wake-up boot region in an event of the booting.

4. The energy-aware home gateway of claim 1, wherein the memory module stores a processor context of the processor module in the idle state, and provides the processor context when returning from the idle state to the normal active state.

5. The energy-aware home gateway of claim 4, wherein the network protocol agent module performs a self-refresh control function on the memory module such that the processor context is continuously maintained during the idle state without being erased.

6. The energy-aware home gateway of claim 1, wherein the network protocol agent module includes:
a network protocol agent core processor for providing network connectivity between a home network appliance in the home network and the external network in the idle state and for detecting an operation of the system; and
an agent information storage for storing information required to operate the network protocol agent core processor.

7. The energy-aware home gateway of claim 1, wherein the network protocol agent module includes:
a service detector for detecting a user event in the idle state, and informing the processor module of the detected result.

8. The energy-aware home gateway of claim 1, wherein the network protocol agent module includes:
a power controller for operating the power supply module.

9. The energy-aware home gateway of claim 1, wherein the network protocol agent module performs a relay function for a peripheral component interconnect (PCI) bus and a local bus when the PCI bus or the local bus is affected by interrupting the power depending on a device interacting with the processor module.

10. A controlling method based on a network protocol for use in an energy-aware home gateway, which has a main processor for performing an operation function and a control function of an overall system in a normal active state in which service traffic exists; a main memory used as a system memory of the main processor; a service function module controlled by the main processor and performing a service function depending on a use state of a user, the service function module including service function sub-modules; a network protocol agent module for processing control traffic in an idle state in which no service traffic exists;

the method comprising:
detecting an idle condition that no service traffic exists, in the normal active state;
storing a processor context of a main processor in the main memory in order to store a current operation state when the idle condition is detected;
interrupting power to the main processor after the processor context is stored;
monitoring user data traffic and user service event by processing control traffic and monitoring network traffic in the idle state after the power is interrupted; and
individually performing a power control on each of the service function sub-modules in the normal active state based on an operation state of the service function module, the operation state is determined based on the use state of the user, so that power to a part of the service function sub-modules is supplied or interrupted.

11. The method of claim 10, further comprising:
performing a self-refresh control operation in the idle state in order to maintain contents of the processor context.

12. The method of claim 10, further comprising:
detecting a wake-up condition by monitoring the user data traffic and/or the user service event in the idle state;
performing booting using a boot loader stored in a wake-up boot region of the main memory when the wake-up condition is detected; and
returning to the normal active state through recovery of the pre-stored processor context.

13. The method of claim 12, wherein the returning includes:
determining which event leads to the wake-up event by examining contents of wake-up event registers; and
performing subsequent processes associated with the event.

* * * * *